US009850106B2

(12) United States Patent
Ratner et al.

(10) Patent No.: US 9,850,106 B2
(45) Date of Patent: *Dec. 26, 2017

(54) MECHANICAL ASSEMBLY FOR LIFTING A BALLOON

(71) Applicant: X Development LLC, Mountain View, CA (US)

(72) Inventors: Daniel Ratner, San Francisco, CA (US); Keegan Gartner, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,836

(22) Filed: Mar. 27, 2017

(65) Prior Publication Data

US 2017/0217736 A1    Aug. 3, 2017

Related U.S. Application Data

(63) Continuation of application No. 15/084,633, filed on Mar. 30, 2016, now Pat. No. 9,650,123, which is a
(Continued)

(51) Int. Cl.
  *B66C 1/66* (2006.01)
  *B64B 1/00* (2006.01)
  (Continued)

(52) U.S. Cl.
  CPC .............. *B66C 1/66* (2013.01); *B64B 1/005* (2013.01); *B64B 1/40* (2013.01); *B64B 1/58* (2013.01); *B64B 1/66* (2013.01); *B66C 1/42* (2013.01)

(58) Field of Classification Search
  CPC .............. B64B 1/005; B64B 1/40; B64B 1/58
  See application file for complete search history.

(56) References Cited

U.S. PATENT DOCUMENTS

| 1,734,812 | A | 11/1929 | Krell |
| 2,721,712 | A | 10/1955 | Frieder et al. |

(Continued)

FOREIGN PATENT DOCUMENTS

| CN | 101137540 A | 3/2008 |
| FR | 2807736 A1 | 10/2001 |
| JP | 2001315695 A | 11/2001 |

OTHER PUBLICATIONS

Examination Report No. 1 for Australian Patent Application No. 2015217565, dated Mar. 14, 2017. 2 pages.
(Continued)

*Primary Examiner* — Christopher P Ellis
(74) *Attorney, Agent, or Firm* — Lerner, David, Littenberg, Krumholz & Mentlik, LLP

(57) ABSTRACT

A lift assembly for use during inflation of a balloon envelope is provided. The lift assembly includes a plate structure that has a set of cavities. Each cavity includes one or more openings passing through the plate. One or more pistons are coupled to the plate through at least one of the openings of each cavity in the set of cavities. Each piston has a hollow tube portion projecting lengthwise from the at least one opening, a flange attached to the hollow tube portion and a grabber portion in communication with the flange. The grabber portion includes a plurality of bearings for grabbing a stud attached to an apex of the balloon envelope. A handle portion is coupled to the plate. The handle is arranged to lift the balloon envelope when the bearings have grabbed a given stud.

20 Claims, 8 Drawing Sheets

Related U.S. Application Data continuation of application No. 14/873,297, filed on Oct. 2, 2015, now Pat. No. 9,346,530, which is a continuation of application No. 14/177,575, filed on Feb. 11, 2014, now Pat. No. 9,180,955.

(51) Int. Cl.
*B64B 1/66* (2006.01)
*B66C 1/42* (2006.01)
*B64B 1/40* (2006.01)
*B64B 1/58* (2006.01)

(56) References Cited

U.S. PATENT DOCUMENTS

| | | |
|---|---|---|
| 2,919,082 A | 12/1959 | Winzen et al. |
| 3,093,351 A | 6/1963 | Ney et al. |
| 3,711,054 A | 1/1973 | Bauer |
| 5,411,427 A | 5/1995 | Nelson et al. |
| 6,394,739 B1 | 5/2002 | Hutchinson |
| 7,503,277 B2 | 3/2009 | Boschma, Jr. et al. |
| 7,559,735 B2 | 7/2009 | Pruteanu et al. |
| 8,061,648 B2 | 11/2011 | Lachenmeier |
| 8,333,589 B2 | 12/2012 | Kfir |
| 8,544,924 B2 | 10/2013 | Inda |
| 2002/0171006 A1 | 11/2002 | Boschma |
| 2007/0102570 A1 | 5/2007 | Luffman |
| 2008/0156929 A1 | 7/2008 | Gobbi et al. |
| 2008/0251635 A1 | 10/2008 | Eberle et al. |
| 2013/0280009 A1 | 10/2013 | Ohman, III et al. |
| 2013/0299654 A1 | 11/2013 | Williams et al. |
| 2014/0077030 A1 | 3/2014 | Cunningham et al. |

OTHER PUBLICATIONS

International Search Report and Written Opinion for Application No. PCT/US2015/011538 dated Apr. 27, 2015.
Notification of the First Office Action for Chinese Patent Application No. 201580008230.5, dated Mar. 1, 2017.

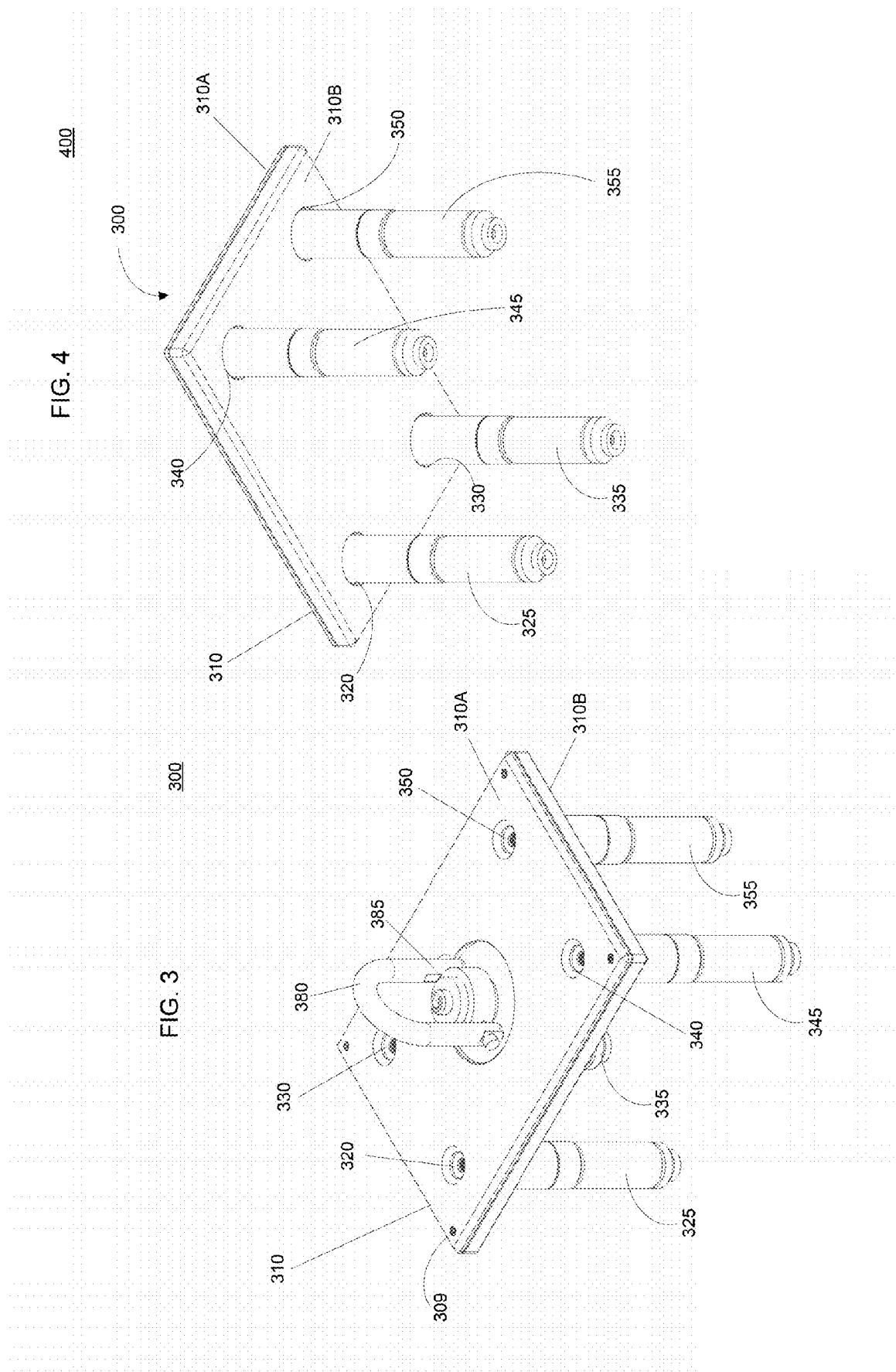

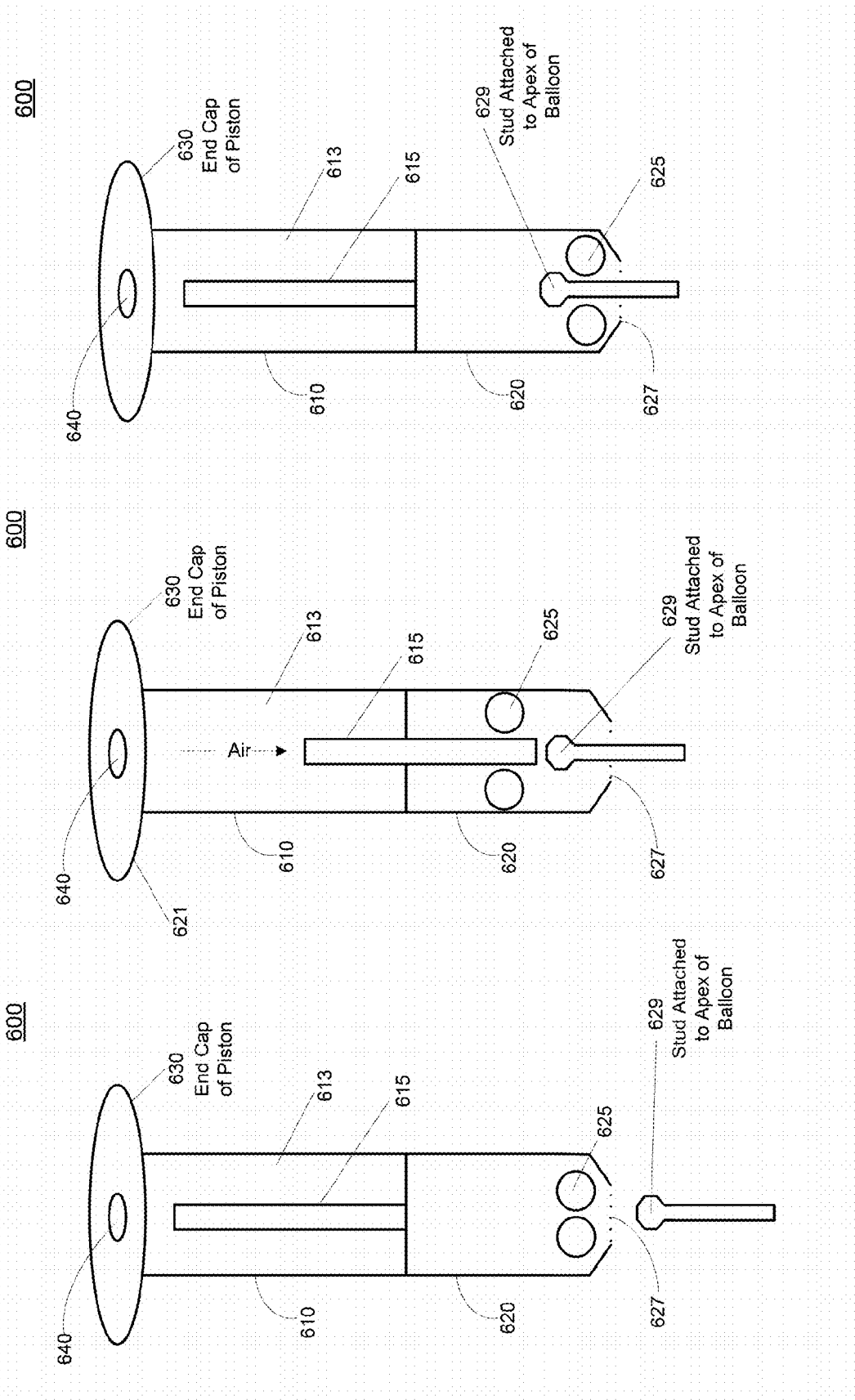

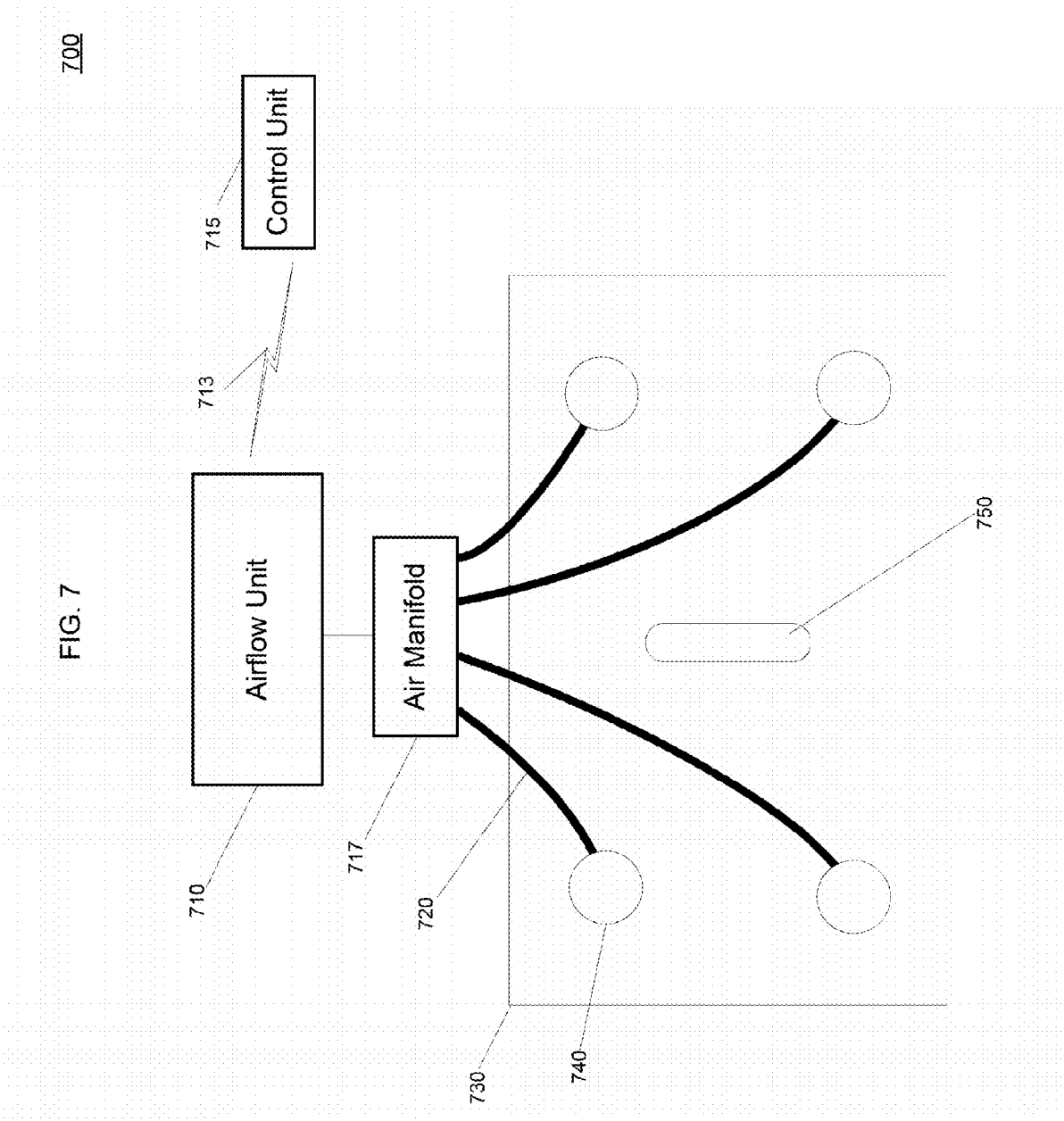

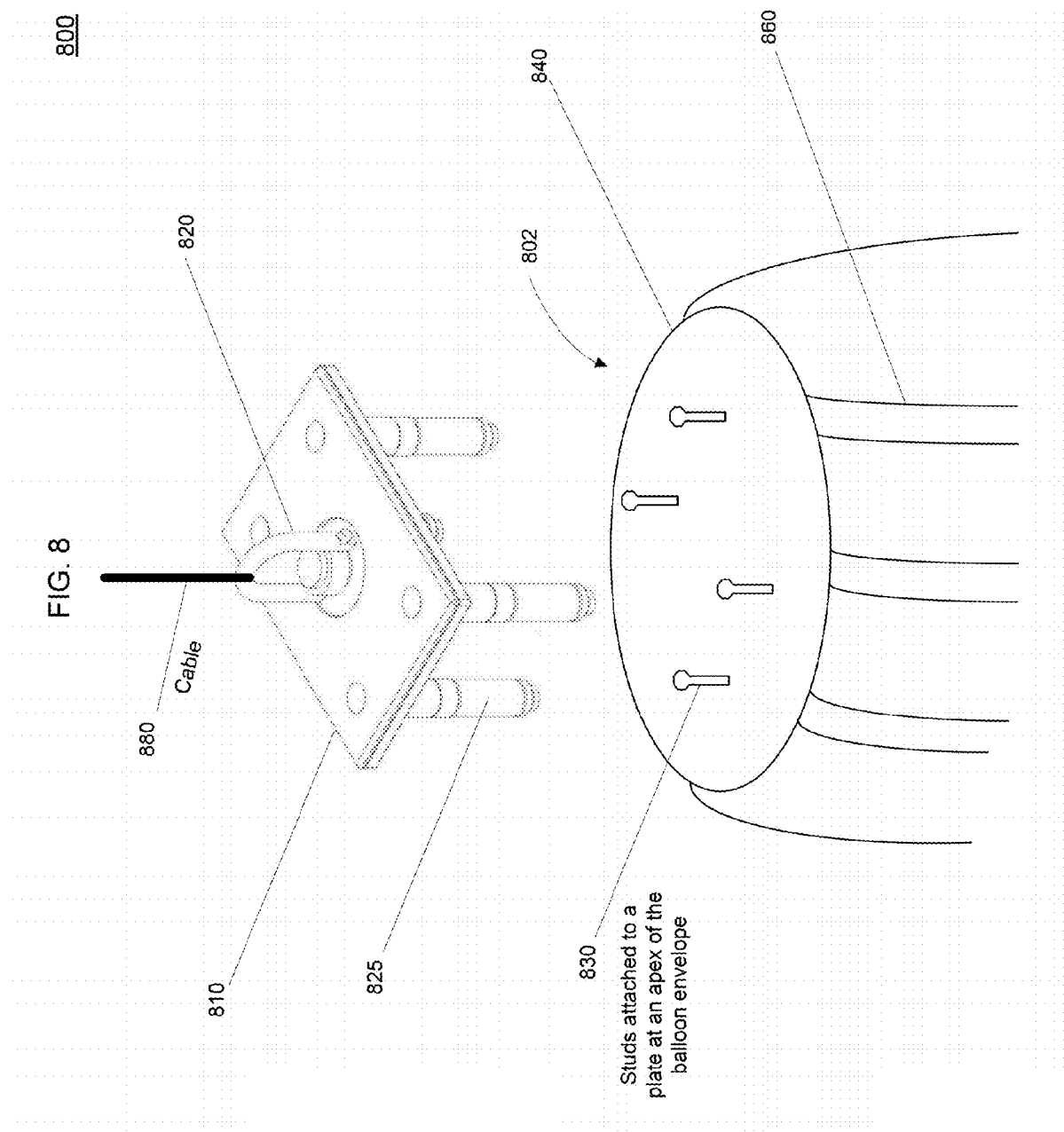

MECHANICAL ASSEMBLY FOR LIFTING A BALLOON

CROSS-REFERENCE TO RELATED APPLICATIONS

The present application is a continuation of U.S. patent application Ser. No. 15/084,633, filed Mar. 30, 2016, which is a continuation of U.S. patent application Ser. No. 14/873,297, filed Oct. 2, 2015, now issued as U.S. Pat. No. 9,346,530, which is a continuation of U.S. patent application Ser. No. 14/177,575, filed Feb. 11, 2014, now issued as U.S. Pat. No. 9,180,955, the disclosures of which are incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, its envelope must be inflated. To accomplish this, typically the balloon envelope is laid out on a work surface. For example, the balloon envelope may be completely laid out on the ground on tarps so that it can be inflated. However, while on the ground, the envelope may be damaged, for instance by people walking across it, which can possibly shorten the balloon's flight life.

BRIEF SUMMARY

Aspects of the present disclosure are advantageous for providing a lift assembly for lifting a balloon envelope while it is being inflated. This may be done while the balloon structure is in a shipping container, which avoids having to lay out the envelope on the ground.

In one embodiment, the lift assembly includes a plate structure that has a set of cavities. Each cavity includes one or more openings passing through the plate structure. One or more pistons are coupled to the plate structure through at least one of the one or more openings of each cavity. Each piston has a hollow tube portion projecting lengthwise from the at least one opening, a flange attached to the hollow tube portion and a grabber portion in communication with the flange. The grabber portion includes a plurality of bearings for grabbing a stud attached to an apex of the balloon envelope. A handle portion is coupled to the plate structure. The handle portion is arranged to lift the balloon envelope when the bearings associated with each piston has grabbed a given stud. In some aspects, an airflow unit is coupled to each piston. The airflow unit is configured to actuate the piston in order for the flange to cause the bearings of the grabber portion to grab the stud.

In one example, each piston includes a cap capable of holding the piston within a given cavity of the plate structure. The cap allows the piston freedom of movement in relation to the plate structure. In this regard, the cap allows the piston to move horizontally and rotationally with respect to an axis of the plate structure.

In another example, a control unit is in communication with the airflow unit. The control unit can remotely control the airflow unit to actuate the pistons. Each piston includes an actuator coupled to the airflow unit. The actuator has a first position for allowing air into and a second position for allowing air out of the hollow tube of the piston. When the actuator is in the first position to allow air into the hollow tube portion, the airflow unit is configured to cause the flange of the piston to extend out into the grabber portion to open the plurality of bearings wide enough for the pull stud to pass. When the actuator is in the second position to allow air out of the hollow tube portion, the airflow unit is configured to cause the flange to retract back into the hollow tube portion to clamp the plurality of bearings around the pull stud.

In yet another example, the lift assembly includes a hoist to lift the balloon envelope when the plate structure is attached. The hoist includes a cable coupled to the handle portion.

Another aspect of the present disclosure provides a system. The system includes a balloon that has a balloon envelope and a lift assembly for use during inflation of the balloon envelope. The lift assembly includes a plate structure that has a set of cavities. Each cavity includes one or more openings for passing through the plate structure. One or more pistons are coupled to the plate structure through at least one of the one or more openings of each cavity. The piston has a hollow tube portion projecting lengthwise from the at least one opening, a flange attached to the hollow tube portion and a grabber portion in communication with the flange. The grabber portion includes a plurality of bearings for grabbing a stud attached to an apex of the balloon envelope. A handle portion is coupled to the plate structure. The handle portion is arranged to lift the balloon envelope when the bearings associated with each piston has grabbed a given stud. In some aspects, an airflow unit is coupled to each piston. The airflow unit is configured to actuate the piston in order for the flange to cause the bearings of the grabber portion to grab the stud.

BRIEF DESCRIPTION OF THE DRAWINGS

FIG. 3 is an example of a lift assembly in accordance with aspects of the present disclosure.

FIG. 4 is another view of the lift assembly of FIG. 3 in accordance with aspects of the present disclosure.

FIGS. 6A-6C are examples of a piston in accordance with aspects of the present disclosure.

FIG. 7 is an example of a control system for actuating a piston in accordance with aspects of the present disclosure.

FIG. 8 is another example of a system in accordance with aspects of the present disclosure.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

The present disclosure generally relates to providing an assembly for lifting a balloon, e.g., out of a shipping box or other container while inflating the balloon envelope. This allows the balloon to be deployed without needing to lay the whole balloon out and possibly causing damage to the balloon envelope. In this disclosure, a lift assembly for a balloon structure is described. The lift assembly includes one or more pistons (e.g., pneumatic pistons), coupled to a plate structure. For example, the pistons may be arranged through an opening near each corner of the plate structure. In one arrangement, each piston has a hollow tube portion, a flange (e.g., a projection) attached to the hollow tube portion, and a grabber portion coupled to the flange. By way of example only, the grabber portion may include a number of ball bearings forming a wreath of bearings for grabbing a pull stud attached to an apex of the balloon structure.

To grab a given pull stud, the pistons of the plate structure feed into an airflow unit that may include an air compressor and manifold. The air manifold can be attached to a solenoid actuator associated with each piston. This actuator allows air in and out of the hollow tube portion of the piston, thus manipulating the flange therein. For example, when the piston is actuated by forcing air into the hollow tube portion, the flange will extend out into the grabber portion, causing the wreath of bearings to open wide enough for the pull stud to pass by them. When the piston is actuated (e.g., by forcing air out of the hollow tube portion), the flange will retract back in the piston body. In this regard, the wreath of bearings will close tightly or clamp around the narrowed neck of the pull stud. When the wreath of bearings of the grabber portion of each piston has grabbed a given pull stud, the handle portion that is coupled to the plate structure can be used to lift the balloon envelope, for example, out of the shipping box.

In some aspects, the pistons include a cap that allows each piston to have some freedom of movement in relation to the plate structure. This will allow the pistons more freedom to line up and slip down over the pull studs. In other aspects, the airflow unit can be controlled remotely, thereby allowing a user to remotely un-clamp the lift assembly from the apex of the balloon structure. For example, this can be accomplished while the user is on the ground and the lift assembly is holding the balloon above the ground.

Example System

Figure 1:
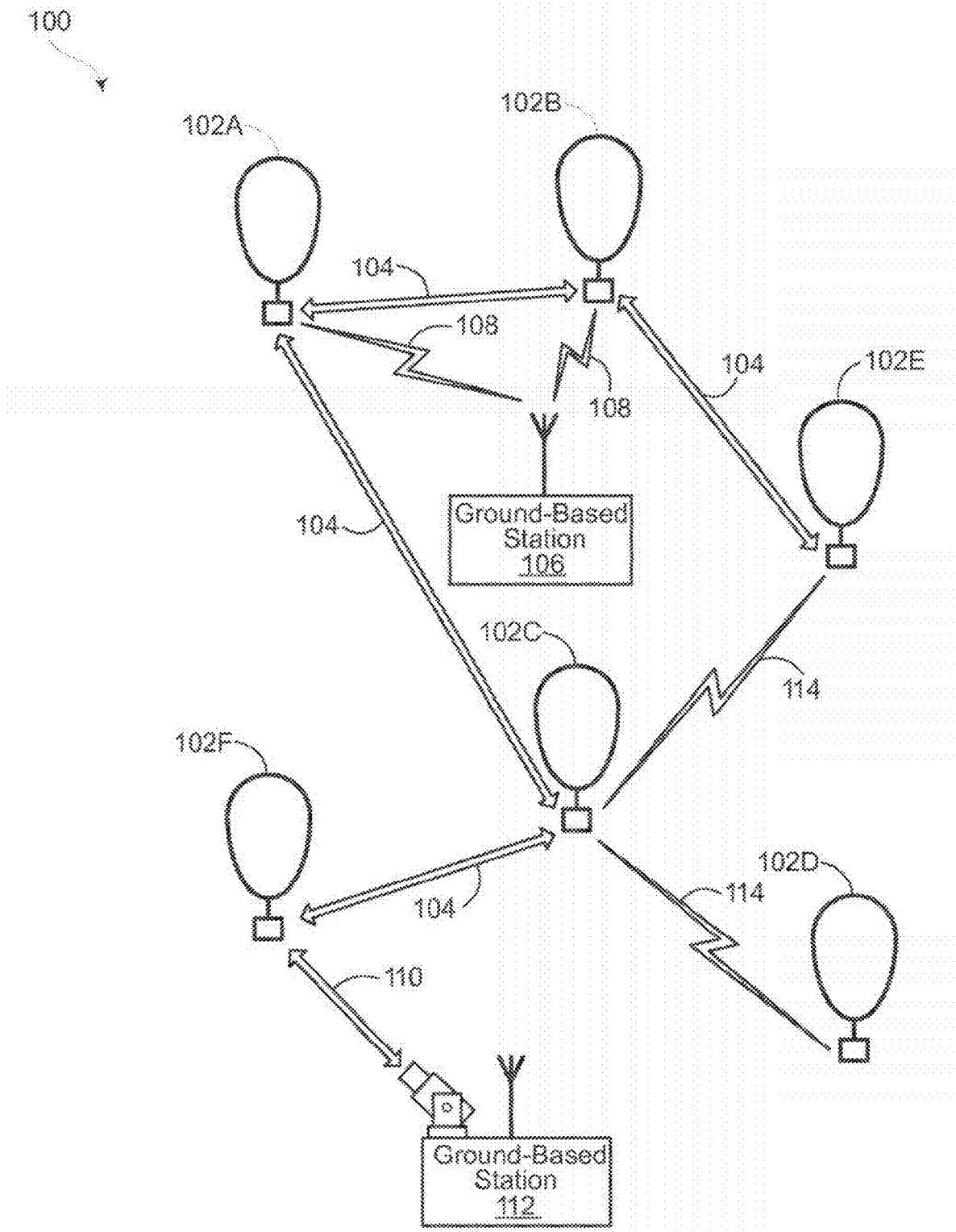
FIG. 1 is a functional diagram of a system in accordance with aspects of the present disclosure.

FIG. 1 depicts an example system 100 in which a balloon as described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible. Further, in order to receive an optical signal from another balloon via an optical link 104, a given balloon may include one or more optical receivers.

The balloons 102A-F may collectively function as a mesh network. More specifically, since balloons 102A-F may communicate with one another using free-space optical links, the balloons may collectively function as a free-space optical mesh network where each balloon may function as a node of the mesh network. The balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. Additional aspects of the balloons are discussed in greater detail below, with reference to FIG. 2.

Figure 2:
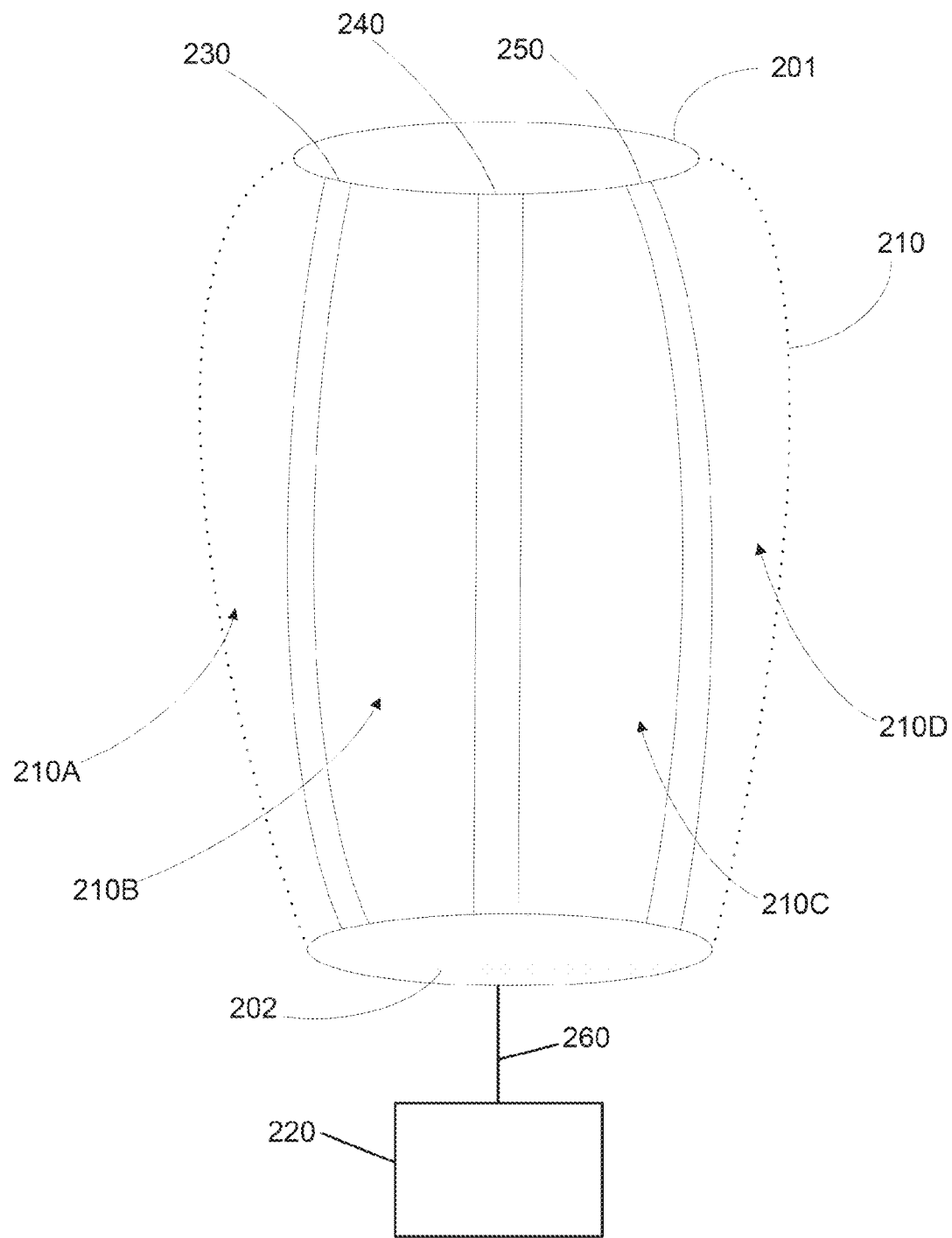
FIG. 2 is an example of a balloon in accordance with aspects of the present disclosure.

FIG. 2 is an example high-altitude balloon 200, which may represent any of the balloons of balloon network 100. As shown, the balloon 200 includes an envelope 210, a payload 220 and a plurality of tendons 230-250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

The individual envelope gores 210A-210D may be shaped so that the length of the edge seam connecting adjacent envelope gores is greater than the length of a centerline of the envelope gores. Thus, the envelope gores 210A-210D may be shaped to better optimize the strain rate experienced by the balloon envelope 210. The pressurized lifting gas within the balloon envelope 210 may cause a force or load to be applied to the balloon 200.

The tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250.

In some aspects, an apparatus can be coupled to the balloon envelope 210 in order to safely deploy the balloon 200. For example, a type of lift assembly can be coupled to the top cap 201 at the apex or top of the balloon envelope 210 in order to lift the envelope in the air during inflation. An advantage of using the lifting assembly is that it avoids the need of laying the whole balloon envelope 210 out, e.g., on the ground during assembly, which can likely damage the envelope and shorten the flight life of the balloon 200. Further aspects regarding the lift assembly are described below.

FIG. 3 is an example of a lift assembly 300. As shown, the lift assembly 300 includes a main body 310, pistons 325, 335, 345 and 355, and a handle 380. In some aspects, the main body 310 of the lift assembly 300 has upper and lower portions with generally planar surfaces. For example, the main body 310 can be a rigid plate structure that includes one or more plates, such as upper plate 310A and lower plate 310B. In some aspects, when the main body 310 includes more than one plate, such as plates 310A and 310B, they are joined together using, e.g., a plurality of screws 309, nut and bolts, fasteners or other devices for securing the plates to each other.

Disposed in the main body 310 of the lift assembly 300 are a number of cavities 320, 330, 340 and 350. Each cavity has corresponding openings that pass through the plate(s) of the main body 310. These cavities are configured so that the corresponding openings on each of the one or more plates are in communication or in other words aligned with each other. This allows the openings associated with a particular cavity to pass from the upper surface of the main body 310 to the lower surface. Although other configurations are possible, in this example, the cavities 320, 330, 340 and 350 and corresponding openings have a substantially cylindrical shape.

The main body 310 is of a material strong enough to support the weight of the balloon envelope, such as steel or aluminum. As shown in FIG. 3, the handle 380, such as a U-bolt, can be coupled to the upper surface of the main body 310 of the lift assembly 310. This handle can be coupled to the main body 310 using, e.g., a screw 385 or other type of fastener. In other examples, the upper surface of the main body 310 may be formed in manner so that the handle is an integral part of the main body 310. The handle allows for the balloon envelope to be lifted when the lift assembly 300 is attached. Techniques for attaching the lift assembly 310 to the balloon envelope are further discussed below.

The plurality of pistons 325, 335, 345 and 355 are configured to couple the lift assembly 310 to the balloon envelope, e.g., via the top cap 201. As shown in FIG. 3, the pistons 325, 335, 345 and 355 extend lengthwise from the lower surface of the main body 310 of the assembly 300. Each cavity 320, 330, 340 and 350 is configured to allow a part of a corresponding one of the pistons to pass through at least one of the openings associated with the cavity. The pistons 325, 335, 345 and 355 can then project through a portion of the main body 310 of the lift assembly. In that regard, the pistons 325, 335, 345 and 355 are also a substantially cylindrical in shape so as to correspond with the shape of each opening and cavity. Other shapes for the pistons and the cavities may be employed.

FIG. 4 is another view 400 of the lift assembly 300 of FIG. 3. In this example, a lower surface of the main body 310 is shown. As shown, piston 325, 335, 345 and 355 project lengthwise from the lower surface through the openings associated with cavities 320, 330, 340 and 350. As discussed, at least one opening is configured so that a given piston can pass through it.

One end of each piston is coupled to the body of the lift assembly 300 in that it rests within a given cavity. For example, an end of piston 325 rests within cavity 320, an end of piston 335 rests within cavity 330, an end of piston 345 rests within cavity 340 and an end of piston 355 rests within cavity 350. The other end of each piston will be attached to the balloon envelope.

Figure 5:
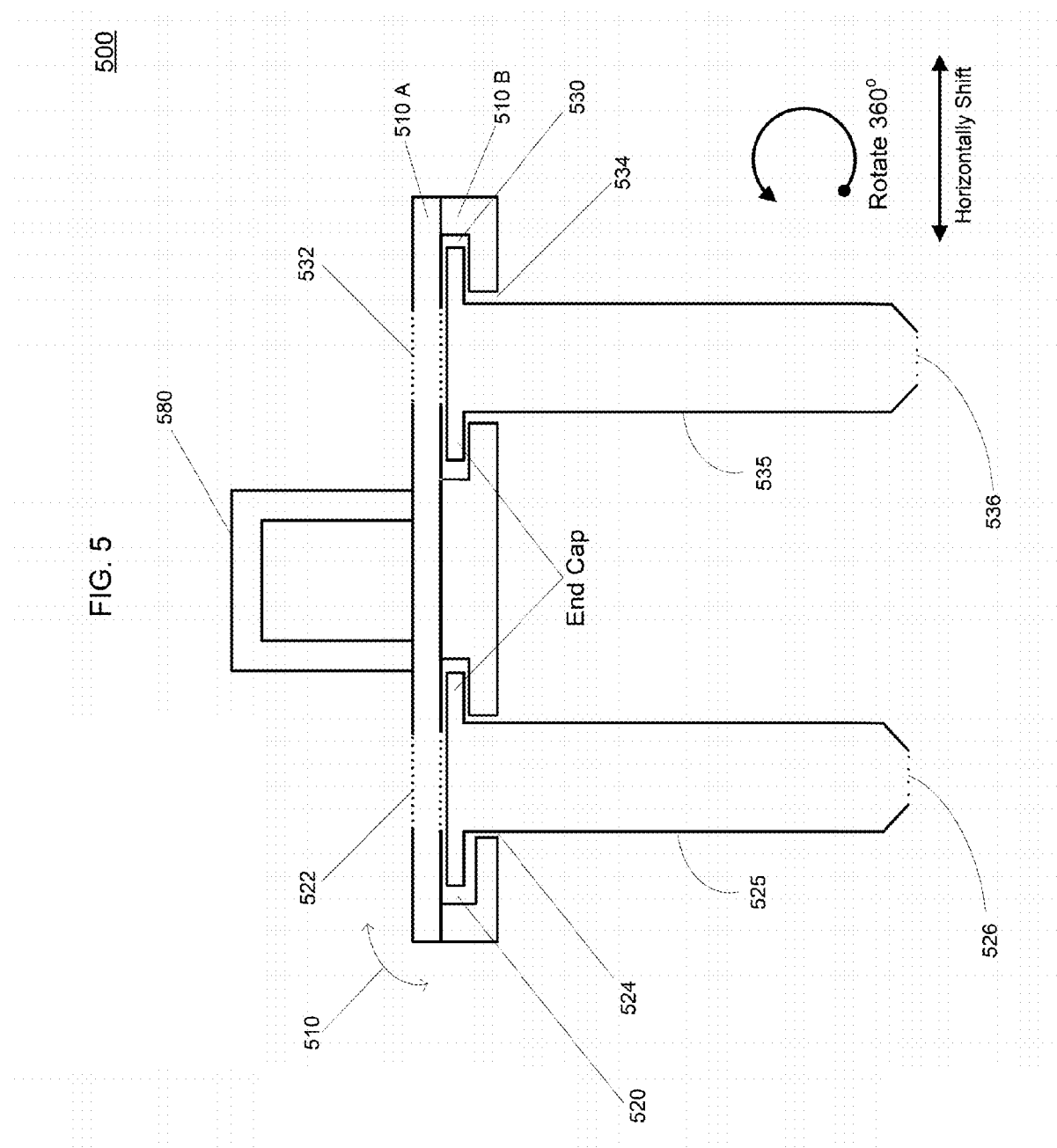
FIG. 5 is another example of a lift assembly in accordance with aspects of the present disclosure.

FIG. 5 is another example of a lift assembly 500. In this example, a side view of the lift assembly 500 is shown. The assembly 500 includes a plate structure 510 that includes upper plate 510A and lower plate 510B joined together, a set of cavities and a handle 580 coupled to the upper plate 510A. Here, cavities 520 and 530 are shown. The cavities 520 and 530 respectively include with one or more openings that go from an upper plate 510A of the plate structure 510 to a lower plate 510B. For example, cavity 520 includes openings 522 and 524 and cavity 530 includes openings 532 and 534.

At least one of the openings allows a part of a particular piston to project through the plate structure 510. For example, when the upper plate 510A and lower plate 510B of the lift assembly 500 are separated, an elongated portion of each of the pistons 525 and 535 can be inserted into a respective opening 524 and 534 on the lower plate 510B. The lower plate 510B is then is joined to the upper plate 510A. As shown in FIG. 5, once the pistons are positioned on the lift assembly 500, the elongated portions of the pistons 524 and 525 project through the plate structure 510.

So that the pistons 525 and 535 do not completely go through the openings 524 and 534, each piston includes an end cap that is capable of the holding that piston within a given cavity of the plate structure 510. The end caps are configured so that they cannot go pass the openings that the elongated part of the piston is projecting through. This allows the pistons 525 and 535 some degree or freedom of movement in relation to the plate structure 510. For this reason, the cavities 522 and 532 may be configured to be slightly over-sized in comparison to the end caps that held within them. This allows each piston to move or otherwise shift horizontally within that cavity. In some aspects, a pad (not shown) can be positioned between the end cap of each piston and the plate structure 510 before the upper plate 510A and lower plate 510B are joined so that the piston does not rattle around in the over-sized cavity. This pad can be silicon or some other type of similar material that can provide a flexible cushion between the end caps and the plate structure 310.

Similarly, the openings 524 and 534 are also slightly over-sized in comparison to the hall of the piston projecting through them. This allows each piston to be able to rotate in the opening. Although other shape combinations are possible, the pistons can rotate in the openings without significant effort because both the piston and the opening typically will have a substantially cylindrical shape.

An advantage of being able to move the pistons 525 and 535 both horizontally as well as rotationally is that they can be easily aligned over a given pull stud attached to the balloon envelope. Once the pull studs are aligned with the pistons 525 and 535, the pistons can then slide over the studs so that they can be inserted into an opening in the hall of each piston. For example, an individual stud may be inserted into opening 526 of piston 525 and opening 536 of piston 535. At which point, the openings 526 and 536 of the pistons 525 and 535 are configured to grab the inserted stud.

FIG. 6A is an example of a piston 600, which may be used in a lift assembly as described above. The piston 600 includes first and second portions 610 and 620 in communication with each other, a plurality of ball bearings 625 for grabbing a given pull stud, such as pull stud 629, an opening 627 for sliding over the stud, and an end cap 630 coupled to one of the portions. In FIG. 6A, the end cap 630 is shown coupled to the first portion 610 of the piston 600. As discussed above, the end cap 630 allows the piston 600 to be held within a cavity of the lift assembly. It also allows the piston some freedom of movement in relation to a main body of the lift assembly thereof.

The first portion 610 of the piston has a hollow tube portion 613 and a flange 615 (e.g., a projection) within the hollow tube portion 613. The hollow tube portion 613 extends lengthwise through a main hull of the piston 600. When the piston 600 is placed in the lift assembly, this hollow tube portion 613 projects lengthwise from the opening that it was placed through. The flange 615 is capable of movement through the hollow tube portion 613. For example, the flange 615 can extend into the second portion 620 of the piston 600 when it is actuated.

To actuate the piston 600, air may be forced into the hollow tube portion 613. Some type of airflow device, such as an air compressor (not shown), may be used to force air into the hollow tube portion 613 of the piston 600. In some configurations, the piston 600 may include an actuator 640 that is attached to the airflow device. This actuator 640 includes an opening that helps move air into and out of the hollow tube portion 613. The actuator 640 may have two positions related to the movement of air in the hollow tube portion 613. In a first position, the actuator 640 allows air to be forced into the hollow tube portion 613. In a second position, the actuator 640 allows air to be removed from the hollow tube portion 613.

With respect to the example of the piston 600 in FIG. 6B, when air is forced into the hollow tube portion 613, the flange 615 extends out into the second portion 620 of the piston 600. This allows the stud 629 to be inserted into the opening 627. The second portion 620 of the piston 600 is the part that is used to grab pull stud 629. For example, the second portion 620 is configured to grab the stud 629 that is shown inserted into the opening 627.

To help grab the stud 629, the second portion 620 employs the ball bearings 625. The ball bearings 625 are situated in a wreath or otherwise generally circular configuration that can be securely clamped around a predetermined part of the pull stud 629. This occurs when the stud has been inserted into the piston 600. As shown in FIG. 6B, when air in the hollow tube portion of the piston 600 makes the flange 615 extend out, this causes the wreath of bearings to open to a larger diameter, thereby allowing the opening 627 to slide over the stud 629.

With respect to the example of the piston 600 in FIG. 6C, when air is removed from the hollow tube portion 613, the flange 615 retracts back from the second portion 620. This allows the wreath of bearings to close into a tighter diameter that clamps around a neck of the stud 629, thereby allowing piston 600 to pick up the stud 629. Once all of the pistons in the lift assembly have secured a particular stud attached to the apex of the balloon envelope, the lift assembly can then be used to lift the envelope.

In some situations, other techniques may be used to expand and contract the diameter of the wreath of bearings. For example, when the stud 629 is pushed through the opening 627, this may cause the ball bearings 625 to spread apart to allow the stud 629 to pass. The ball bearings 625 may then settle around the neck of the stud, thereby contracting the diameter of the wreath of bearings. To release the stud 629, air may be forced into the piston. As discussed above, this causes the flange 610 to extend out into the second portion 620, thereby expanding the diameter of the wreath of bearings so that the stud 629 can be released.

Turing to FIG. 7, an example of a control system 700 for actuating the pistons is shown. The control system 700 includes a control unit 715 for activating airflow to the pistons of lift assembly 730, and an airflow unit 710 that includes an air manifold 717 and an airflow device, such as an air compressor (not shown), to force air through the manifold. Alternatively, the air compressor may be external to the control system. The air manifold directs airflow into each piston of the lift assembly 730 via an opening in corresponding cavity. The lift assembly 730 includes a set of cavities 740 disposed in a main body of the assembly. Each cavity holds a piston that can be actuated in order for it to grab a given stud attached to a balloon envelope. This allows a handle 750 coupled to the main body of the lift assembly to be used for lifting the balloon envelope.

The air manifold is coupled to each piston using, for example, one or more hoses 720 or a similar type of tubing. These hoses 720 allow air to flow between the airflow unit 710 and the pistons. The airflow unit 710 may be configured to actuate the pistons in order to cause them to grab the studs. In this regard, each piston may include an actuator that is in communication through the hoses 720 with the airflow unit 710. These actuators allow air into and out of the hollow tube of pistons. As discussed above, when the actuators are in a first position, air may flow from the air manifold 710 into the pistons causing it to allow a given stud to be inserted into a portion of the piston. When the actuators are in a second position, this may cause air to flow from the piston to the airflow unit 710, thus causing the pistons to grab a part of the stud that has been inserted.

In some aspects, the pistons can be actuated remotely. For example, the control unit 715 can remotely control the flow of air to and from the lift assembly 700. To this end, this control unit 715 can be used to turn on or off the airflow device (e.g., compressor) associated with the airflow unit 715. The control unit 715 may communicate with the airflow unit 715 using communication link 713. For example, this communication link 713 can be a wired or wireless link that uses several kinds wireless communication protocols, such as WiFi, Bluetooth or other protocols. An advantage of being able to control the airflow unit 710 remotely is that it allows a user to be able to remotely actuate the pistons, e.g., for releasing the studs, while the user is on the ground and the lift assembly 730 is high in the air with the balloon envelope.

FIG. 8 is an example of a system 800 for lifting a balloon envelope 802. In this example, the system 800 includes a lift assembly 810 that has a number of pistons, such as piston 825, coupled to the assembly 810. As discussed above, one end of each of the pistons is capable of grabbing a stud, such as stud 830, which is attached to an apex of the balloon envelope 802. For example, these studs are attached to an apparatus, such as a top plate or top cap, positioned at the apex in order to secure a number of tendons 860 to the envelope.

Once the pistons of the lift assembly 810 have grabbed the studs, the balloon envelope 802 can be lifted. For this purpose, the lift assembly 810 includes a handle 820, such as a U-bolt, coupled to the main body. In some aspects, this handle 820 can be attached to a hoist device, such as a crane, forklift, winch or pulley assembly (not shown) capable of lifting the weight of the balloon envelope 802. The hoist device may be coupled to the handle 820 using a cable 880, which may be used to lift the balloon envelope 802 high enough for the envelope to be inflated.

Figure 9C:
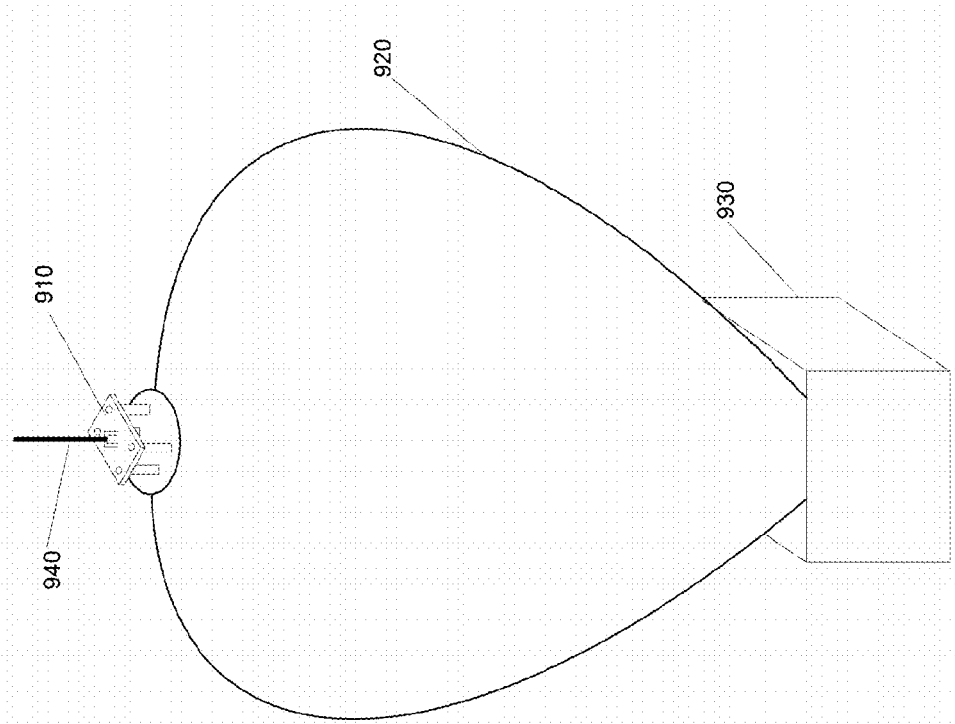
FIGS. 9A-9C are examples of a lift assembly lifting a balloon envelope in accordance with aspects of the present disclosure.
Figure 9B:
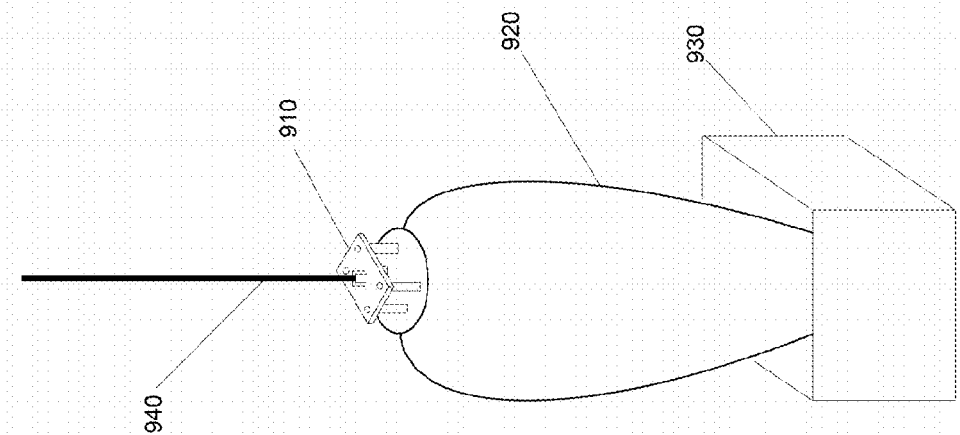
Figure 9A:
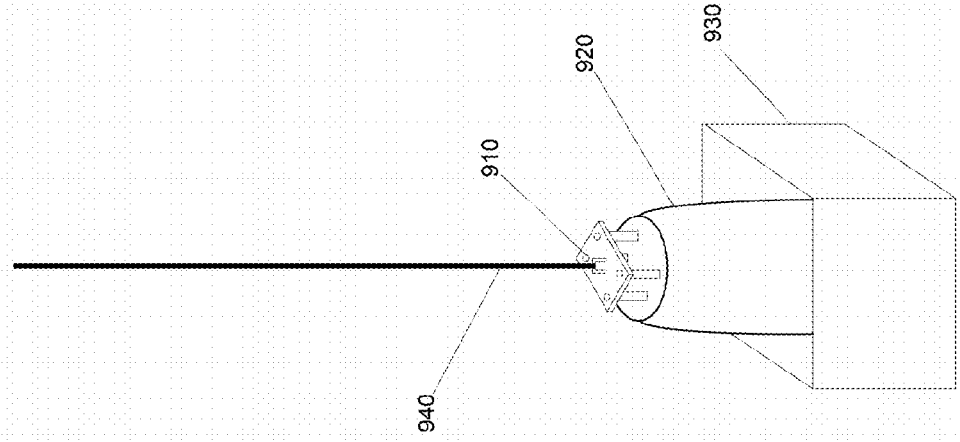

Turing to FIGS. 9A-C, an example 900 of a lift assembly 910 lifting a balloon envelope 920 is shown. In this example, in FIG. 9A the balloon envelope 920 is shown coming out of a box 930, such as a shipping box for the envelope 920. As shown, the lift assembly 910 is attached to an apex of the balloon envelope 920. In this example, a hoisting device (not shown) using a cable 950 is used to pull the balloon envelope 920 upward. In FIG. 9B, the lift assembly 910 is shown with the balloon envelope 920 even higher out of the box 930. And FIG. 9C shows the balloon envelope 920 at another height. For example, this may be a height high enough to accommodate the fully inflated balloon envelope 920. Once the balloon envelope 920 is inflated, the lift assembly 810 may release the envelope so that the balloon can be deployed. For example, a control unit for the remotely controlled airflow unit 710 as discussed with regard to FIG. 7 may be engaged so that the pistons of the lift assembly 910 may release the studs attached to the apex of the balloon envelope 920.

The above-described aspects of the technology may be advantageous for lifting a balloon envelope, e.g., straight out of a shipping box while inflating it with air. This may allow the balloon envelope to be inflated without the need to lay it out on the ground. By providing an assembly for lifting the balloon envelope, the envelope can be protected from damage that can short its flight life. Moreover, the various components of the assembly may be modified to further manage and facilitate lifting the balloon envelope while it is being inflated.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for lifting an inflatable envelope, the system comprising:
   a plate structure having an opening passing through the plate structure; and
   an actuating member attached to the plate structure through the opening, the actuating member having a body portion projecting from the opening, a projection attached to a tube portion and an attachment portion in communication with the projection, the attachment portion being configured for releasable attachment to a portion of the envelope and to allow the plate structure and actuating member to lift the envelope.

2. The system of claim 1, wherein the attachment portion is configured for attachment to a stud attached to the envelope.

3. The system of claim 1, further comprising an airflow unit coupled to the actuating member, the airflow unit being configured to actuate the actuating member in order attach the attachment portion to the balloon envelope.

4. The system of claim 1, wherein the actuating member includes a cap at one end of the actuating member, the cap being configured to hold the actuating member within the opening.

5. The system of claim 1, wherein the plate structure and actuating member are arranged to facilitate lifting of the envelope while the envelope is being inflated.

6. The system of claim 1, wherein the attachment portion includes a plurality of ball bearings configured to grab the portion of the balloon envelope.

7. The system of claim 6, wherein the actuating member is configured to, when actuated to a first position, extend out into the attachment portion in order to open the plurality of bearings wide enough to attach the attachment portion to the portion of the envelope.

8. The system of claim 7, wherein the actuating member is configured to, when actuated to a second position, clamp the plurality of bearings around the portion of the envelope.

9. The system of claim 6, wherein the plurality of ball bearings are arranged as a wreath.

10. The system of claim 1, wherein the tube portion is a hollow tube portion and the projection is configured to pass through the hollow tube portion when the actuating member is actuated.

11. The system of claim 10, wherein the hollow tube portion is configured to be filled with air in order to actuate the actuating member.

12. The system of claim 1, further comprising the envelope.

13. The system of claim 1, further comprising a hoist device arranged with the plate structure and actuating member in order to lift the envelope high enough to accommodate a fully inflated balloon envelope.

14. The system of claim 1, wherein the plate structure is formed from two or more plates joined to one another such that the opening extends through each of the two or more plates.

15. The system of claim 1, wherein the actuating member includes a piston arranged at least partially in the opening.

16. The system of claim 1, wherein the opening and the actuating member have complementary shapes.

17. The system of claim 16, wherein the complementary shapes allow the actuating member to rotate within the opening.

18. The system of claim 1, further comprising a handle attached to the plate structure.

19. The system of claim 1, wherein the plate structure includes an integrated handle.

20. The system of claim 1, further comprising at least three additional actuating members.

* * * * *